United States Patent
Liu et al.

(10) Patent No.: US 10,116,554 B2
(45) Date of Patent: Oct. 30, 2018

(54) DATA FLOW PROCESSING METHOD AND APPARATUS

(71) Applicant: Huawei Technologies Co., Ltd., Shenzhen (CN)

(72) Inventors: Hongkuan Liu, Hangzhou (CN); Tao Wang, Shenzhen (CN); Zhangang Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 146 days.

(21) Appl. No.: 15/242,246

(22) Filed: Aug. 19, 2016

(65) Prior Publication Data
US 2016/0359734 A1 Dec. 8, 2016

Related U.S. Application Data (63) Continuation of application No. PCT/CN2014/072363, filed on Feb. 21, 2014.

(51) Int. Cl.
*H04L 12/721* (2013.01)
*H04L 12/801* (2013.01)
(Continued)

(52) U.S. Cl.
CPC .............. *H04L 45/38* (2013.01); *H04L 41/00* (2013.01); *H04L 41/0686* (2013.01);
(Continued)

(58) Field of Classification Search
None
See application file for complete search history.

(56) References Cited

U.S. PATENT DOCUMENTS

| | | | | |
|---|---|---|---|---|
| 7,281,085 B1 * | 10/2007 | Garg | ...................... | G11C 15/00 370/235 |
| 2011/0292939 A1 | 12/2011 | Subramaian et al. | | |

(Continued)

FOREIGN PATENT DOCUMENTS

| | | |
|---|---|---|
| CN | 1878112 A | 12/2006 |
| CN | 101098335 A | 1/2008 |

(Continued)

OTHER PUBLICATIONS

"OpenFlow Switch Specification," Version 1.3.3 (Protocol version 0x04), ONF TS-015, Sep. 27, 2013, 165 pages.
(Continued)

*Primary Examiner* — James P Duffy
(74) *Attorney, Agent, or Firm* — Conley Rose, P.C.

(57) ABSTRACT

The present disclosure relates to the field of communications technologies. The method in embodiments of the present disclosure includes: determining a destination switch for service migration when a flow table capacity of a source switch is greater than a specified threshold; generating an equivalent flow entry that is equivalent to each initial flow entry of at least two initial flow entries stored in the source switch, and delivering each generated equivalent flow entry to the destination switch, where an equivalent flow entry that is equivalent to any initial flow entry is used by the destination switch to process a data packet that matches the any initial flow entry and that is forwarded by the source switch; and generating an aggregated flow entry by aggregating the at least two initial flow entries, and delivering the aggregated flow entry to the source switch.

20 Claims, 6 Drawing Sheets

(51) Int. Cl.
*H04L 12/24* (2006.01)
*H04L 12/26* (2006.01)
*H04L 12/851* (2013.01)
*H04L 12/927* (2013.01)

(52) U.S. Cl.
CPC .......... *H04L 43/0817* (2013.01); *H04L 43/16* (2013.01); *H04L 47/10* (2013.01); *H04L 47/2483* (2013.01); *H04L 47/805* (2013.01)

(56) References Cited

U.S. PATENT DOCUMENTS

| | | | |
|---|---|---|---|
| 2012/0209989 A1* | 8/2012 | Stewart | G06F 9/5061 709/224 |
| 2013/0010803 A1 | 1/2013 | Yamaguchi | |
| 2013/0258847 A1 | 10/2013 | Zhang et al. | |
| 2014/0016476 A1* | 1/2014 | Dietz | H04L 43/0817 370/238 |
| 2014/0241356 A1* | 8/2014 | Zhang | H04L 45/38 370/392 |
| 2015/0146539 A1* | 5/2015 | Mehta | H04L 47/125 370/237 |
| 2016/0212696 A1 | 7/2016 | Tu et al. | |

FOREIGN PATENT DOCUMENTS

| | | |
|---|---|---|
| CN | 101335686 A | 12/2008 |
| CN | 101562573 A | 10/2009 |
| CN | 101909005 A | 12/2010 |
| CN | 102783097 A | 11/2012 |
| CN | 103200122 A | 7/2013 |
| CN | 103532878 A | 1/2014 |
| WO | 2013150438 A1 | 10/2013 |

OTHER PUBLICATIONS

Lin, W., et al., "D2ENDIST-FM: Flow Migration in Routing of OpenFlow-based Cloud Networks," XP032550305, Nov. 11-13, 2013, pp. 170-174.
Foreign Communication From A Counterpart Application, European Application No. 14883299.1, Extended European Search Report dated Jan. 17, 2017, 10 pages.
Foreign Communication From A Counterpart Application, PCT Application No. PCT/CN2014/072363, English Translation of International Search Report dated Nov. 28, 2014, 2 pages.
Foreign Communication From A Counterpart Application, PCT Application No. PCT/CN2014/072363, English Translation of Written Opinion dated Nov. 28, 2014, 6 pages.
Machine Translation and Abstract of Chinese Publication No. CN101098335, Jan. 2, 2008, 21 pages.
Machine Translation and Abstract of Chinese Publication No. CN101909005, Dec. 8, 2010, 19 pages.
Foreign Communication From a Counterpart Application, Chinese Application No. 201480000297.X, Chinese Office Action dated Feb. 12, 2018, 7 pages.

* cited by examiner

DATA FLOW PROCESSING METHOD AND APPARATUS

CROSS-REFERENCE TO RELATED APPLICATIONS

This application is a continuation application of international application number PCT/CN2014/072363 filed on Feb. 21, 2014, which is incorporated by reference.

TECHNICAL FIELD

The present disclosure relates to the field of communications technologies, and in particular, to a data flow processing method and apparatus.

BACKGROUND

The concept of OpenFlow (OpenFlow), which was first introduced by Professor Nick Mckeown at Stanford University and later became a subproject of a Global Environment for Network Innovations (GENI) plan, is an open protocol standard supported by The Stanford Clean Slate Program. In OpenFlow, a control function is separated from a network device, a flow table structure is maintained in the network device, and a data packet is forwarded according to a flow table, where generation, maintenance, and configuration of the flow table are managed by a controller. In this architecture in which control is separated from forwarding, the controller may flexibly manage and configure a network resource in a forwarding link.

Figure 1:
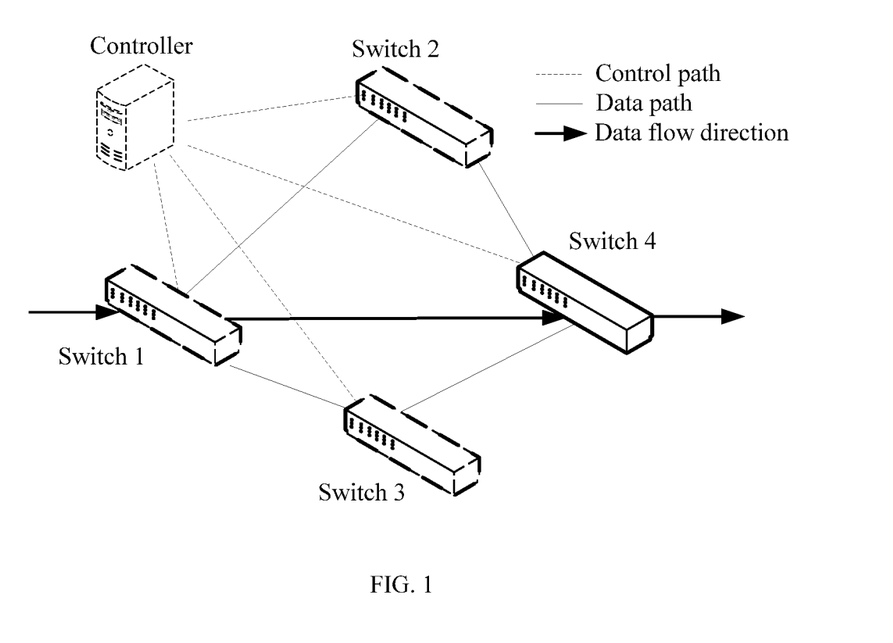
FIG. 1 is a schematic diagram of data flow processing in a background part.

The OpenFlow mainly includes two parts: a switch and a controller. The switch forwards a data packet according to a flow table, and represents a data forwarding plane; the controller implements a management and control function using a global network view, and represents a control plane. For the switch, if a processing capability of the switch deteriorates, quality of service forwarding cannot be ensured, which even leads to a service interruption or a failure to respond to a new service. For example, when a flow table capacity of a switch in a service link reaches a storage upper limit of the switch, a new flow entry cannot be stored, that is, a new service cannot be processed, causing a network to be in a false saturated state and a waste of resources. As shown in FIG. 1, after a flow table of a switch 1 is full, a new flow service that passes through the switch 1 cannot be established, and at the same time, a storage capacity of a flow table of another switch may still be in a lower level. Therefore, flow table resources in an entire network are not properly used, resulting in a waste of network resources.

In conclusion, after a flow table of a switch in a service processing link is fully loaded, the switch cannot store a new flow entry or further process a new service, resulting in a waste of network resources.

SUMMARY

Embodiments of the present disclosure provide a data flow processing method and apparatus, which are used to resolve a problem that after a flow table of a switch in a service processing link is fully loaded, the switch cannot store a new flow entry or further process a new service, resulting in a waste of network resources.

According to a first aspect, a data flow processing method is provided, including: determining a destination switch for service migration when a flow table capacity of a source switch is greater than a specified threshold; generating an equivalent flow entry that is equivalent to each initial flow entry of at least two initial flow entries stored in the source switch, and delivering each generated equivalent flow entry to the destination switch, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry; and generating an aggregated flow entry by aggregating the at least two initial flow entries, and delivering the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

With reference to the first aspect, in a first possible implementation manner, it is determined that the flow table capacity of the source switch is greater than the specified threshold according to the following step: receiving an event alarm message sent by the source switch, where the event alarm message is used to indicate that the flow table capacity of the source switch is greater than the specified threshold.

With reference to the first aspect, or the first possible implementation manner of the first aspect, in a second possible implementation manner, the generating an aggregated flow entry by aggregating the at least two initial flow entries is specifically: generating, according to a specified match field, the aggregated flow entry by aggregating at least two initial flow entries that have a same match field.

With reference to the second possible implementation manner of the first aspect, in a third possible implementation manner, the match field includes one or more of the following items: a Transmission Control Protocol (TCP) source port, a TCP destination port, a User Datagram Protocol (UDP) source port, a UDP destination port, a virtual local area network (VLAN) identifier (ID), a VLAN priority, an Ethernet source media access control (MAC) address, an Ethernet destination MAC address, a source Internet Protocol (IP) address, a destination IP address, an Ethernet type, and a switch ingress port.

With reference to the first aspect, or any possible implementation manner of the first to the third possible implementation manners of the first aspect, in a fourth possible implementation manner, the determining a destination switch for service migration includes: sending a processing capability query message to one or more other switches except the source switch, and receiving a processing capability answer message fed back by the one or more other switches; determining a processing capability of the one or more other switches according to the processing capability answer message; and determining the destination switch for the service migration in the one or more other switches according to the processing capability.

With reference to the first aspect, or any possible implementation manner of the first to the fourth possible implementation manners of the first aspect, in a fifth possible implementation manner, the aggregated flow entry is further used to indicate to the source switch that a priority of the aggregated flow entry is higher than a priority of each flow entry in the initial flow entries.

According to a second aspect, a data flow processing apparatus is provided, including: a determining module configured to: determine a destination switch for service migration when a flow table capacity of a source switch is greater than a specified threshold, indicate that a first generation module and a second generation module need to perform service migration processing, and notify the first generation module of the determined destination switch; the first generation module configured to: generate an equivalent flow entry that is equivalent to each initial flow entry of at least two initial flow entries stored in the source switch, and deliver each generated equivalent flow entry to the destination switch determined by the determining module, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry; and the second generation module configured to: generate an aggregated flow entry by aggregating the at least two initial flow entries, and deliver the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

With reference to the second aspect, in a first possible implementation manner, the apparatus further includes: a receiving module configured to: before the determining module determines the destination switch for the service migration, receive an event alarm message sent by the source switch, where the event alarm message is used to indicate that the flow table capacity of the source switch is greater than the specified threshold.

With reference to the second aspect, or the first possible implementation manner of the second aspect, in a second possible implementation manner, the second generation module is specifically configured to generate, according to a specified match field, the aggregated flow entry by aggregating at least two initial flow entries that have a same match field.

With reference to the second possible implementation manner of the second aspect, in a third possible implementation manner, the match field includes one or more of the following items: a TCP source port, a TCP destination port, a UDP source port, a UDP destination port, a VLAN ID, a VLAN priority, an Ethernet source MAC address, an Ethernet destination MAC address, a source IP address, a destination IP address, an Ethernet type, and a switch ingress port.

With reference to the second aspect, or any possible implementation manner of the first to the third possible implementation manners of the second aspect, in a fourth possible implementation manner, the determining module is specifically configured to: send a processing capability query message to one or more other switches except the source switch, and receive a processing capability answer message fed back by the one or more other switches; determine a processing capability of the one or more other switches according to the processing capability answer message; and determine the destination switch for the service migration in the one or more other switches according to the processing capability.

With reference to the second aspect, or any possible implementation manner of the first to the fourth possible implementation manners of the second aspect, in a fifth possible implementation manner, the aggregated flow entry is further used to indicate to the source switch that a priority of the aggregated flow entry is higher than a priority of each flow entry in the initial flow entries.

According to a third aspect, a data flow processing apparatus is provided, including a processor and a memory, where the memory stores an execution instruction, and when the apparatus runs, the processor communicates with the memory, and the processor executes the execution instruction, such that the apparatus executes the following method: determining a destination switch for service migration when a flow table capacity of a source switch is greater than a specified threshold; generating an equivalent flow entry that is equivalent to each initial flow entry of at least two initial flow entries stored in the source switch, and delivering each generated equivalent flow entry to the destination switch, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry; and generating an aggregated flow entry by aggregating the at least two initial flow entries, and delivering the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

With reference to the third aspect, in a first possible implementation manner, in the method executed by the processor, it is determined that the flow table capacity of the source switch is greater than the specified threshold according to the following step: receiving an event alarm message sent by the source switch, where the event alarm message is used to indicate that the flow table capacity of the source switch is greater than the specified threshold.

With reference to the third aspect, or the first possible implementation manner of the third aspect, in a second possible implementation manner, in the method executed by the processor, the generating an aggregated flow entry by aggregating the at least two initial flow entries is specifically: generating, according to a specified match field, the aggregated flow entry by aggregating at least two initial flow entries that have a same match field.

With reference to the second possible implementation manner of the third aspect, in the third possible implementation manner, the match field includes one or more of the following items: a TCP source port, a TCP destination port, a UDP source port, a UDP destination port, a VLAN ID, a VLAN priority, an Ethernet source MAC address, an Ethernet destination MAC address, a source IP address, a destination IP address, an Ethernet type, and a switch ingress port.

With reference to the third aspect, or any possible implementation manner of the first to the third possible implementation manners of the third aspect, in a fourth possible implementation manner, in the method executed by the processor, the determining a destination switch for service migration includes: sending a processing capability query message to one or more other switches except the source switch, and receiving a processing capability answer message fed back by the one or more other switches; determining a processing capability of the one or more other switches according to the processing capability answer message; and determining the destination switch for the service migration in the one or more other switches according to the processing capability.

With reference to the third aspect, or any possible implementation manner of the first to the fourth possible implementation manners of the third aspect, in a fifth possible implementation manner, the aggregated flow entry is further used to indicate to the source switch that a priority of the aggregated flow entry is higher than a priority of each flow entry in the initial flow entries.

According to the foregoing data flow processing method, after a flow table of a switch in a service processing link is fully loaded, a controller may migrate a data flow, in a flow entry aggregation manner, to another switch for processing, to implement a proper configuration of load in all switches without affecting a switching service, and to resolve a problem that after a flow table of a switch is fully loaded, the switch cannot further process a new service, resulting in a waste of network resources.

DESCRIPTION OF EMBODIMENTS

In the embodiments of the present disclosure, after a flow table capacity of a source switch is greater than a specified threshold, an aggregated flow entry by aggregating at least two flow entries stored in the source switch and a destination switch for service migration are determined; an equivalent flow entry that is equivalent to the at least two flow entries is delivered to the destination switch, and the aggregated flow entry is delivered to the source switch, such that the source switch forwards, to the destination switch, a data flow that matches the aggregated flow entry, and the destination switch processes, according to the equivalent flow entry, a data flow that matches any flow entry of the at least two flow entries and that is forwarded by the source switch. Therefore, using the embodiments of the present disclosure, when a flow table of a switch in a service processing link is fully loaded, a data flow may be migrated, in a flow entry aggregation manner, to another switch for processing, to implement a proper configuration of load in all switches without affecting a switching service.

The following further describes the embodiments of the present disclosure in detail with reference to accompanying drawings in this specification.

Figure 2:
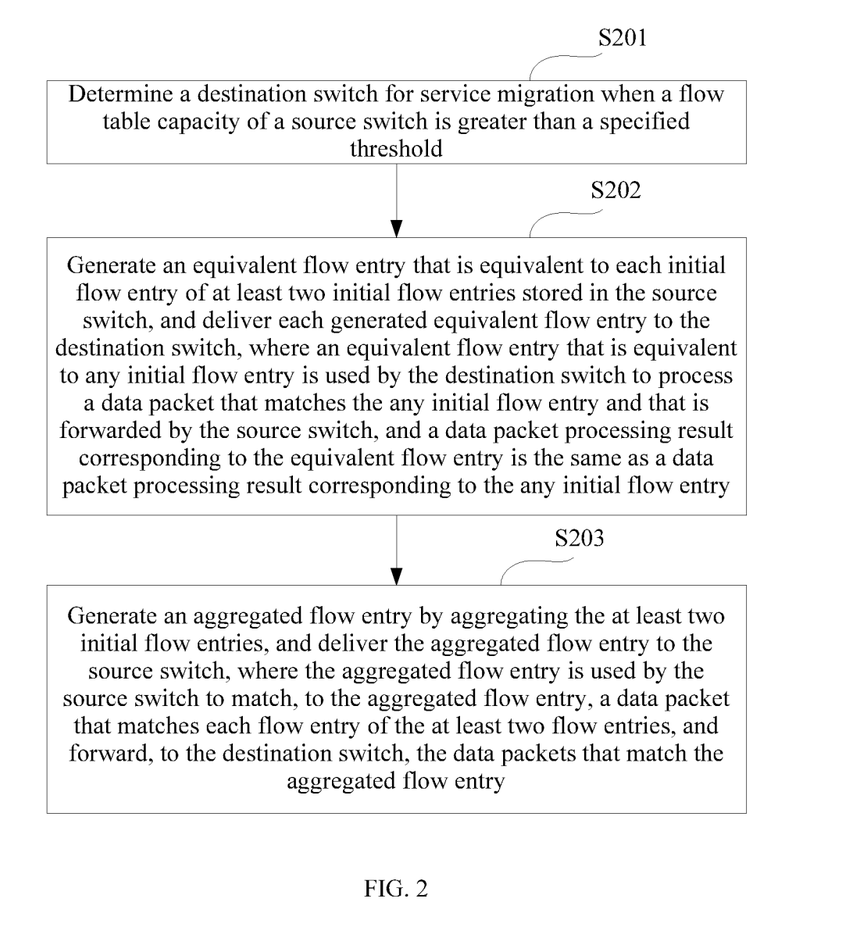
FIG. 2 is a flowchart of a data flow processing method according to embodiment 1 of the present disclosure.

As shown in FIG. 2, FIG. 2 is a flowchart of a data flow processing method according to embodiment 1 of the present disclosure, where the method includes the following steps:

S201: Determine a destination switch for service migration when a flow table capacity of a source switch is greater than a specified threshold.

S202: Generate an equivalent flow entry that is equivalent to each initial flow entry of at least two initial flow entries stored in the source switch, and deliver each generated equivalent flow entry to the destination switch, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry.

S203: Generate an aggregated flow entry by aggregating the at least two initial flow entries, and deliver the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

Figure 3:
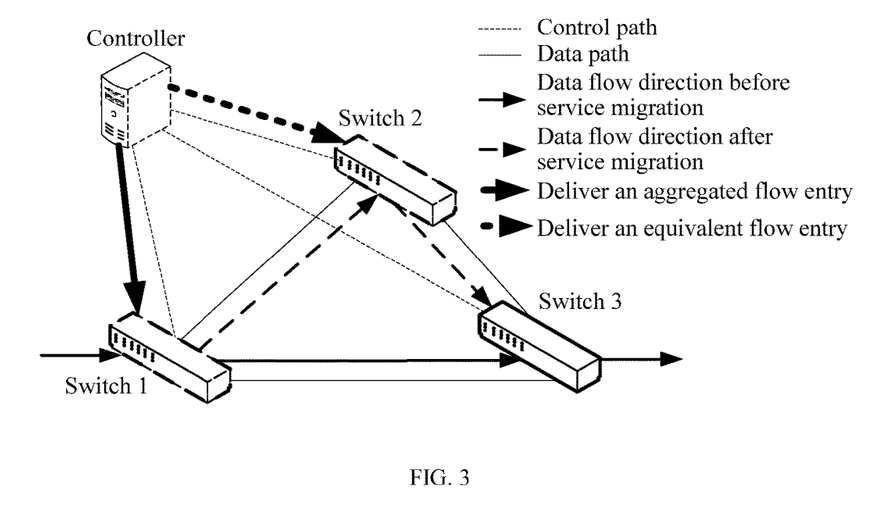
FIG. 3 is a schematic diagram of service migration according to an embodiment of the present disclosure.

This embodiment of the present disclosure may be executed by a controller. After determining that a flow table capacity of any switch exceeds a warning value, the controller may aggregate multiple flow entries that have a common feature (for example, a same match field such as an input port) into one flow entry, to reduce a capacity occupied by all flow entries and save a flow table resource; and the controller determines a destination switch to which data packets that match the aggregated flow entry are to be migrated, and migrates these data packets to the destination switch for processing. In a specific implementation manner, an equivalent flow entry that is equivalent to an initial flow entry that exists before aggregation is delivered to the destination switch, and an aggregated flow entry is delivered to the source switch, such that the source switch forwards, to the destination switch according to the aggregated flow entry, all received data packets that match the aggregated flow entry (that is, the aggregated flow entry instructs the source switch to forward the data packets that match the aggregated flow entry to the destination switch for processing). The destination switch processes, according to all received equivalent flow entries, the data packets that match the aggregated flow entry and that are forwarded by the source switch, that is, any equivalent flow entry may be used to process a data packet that matches an initial flow entry equivalent to the equivalent flow entry, and an effect of data processing performed by the destination switch on the data packet according to the equivalent flow entry is the same as an effect of data processing performed by the source switch on the data packet according to the initial flow entry. As shown in FIG. 3, FIG. 3 is a schematic diagram of service migration according to embodiment 1 of the present disclosure. After a flow table capacity of a switch 1 is limited, a controller aggregates at least two flow entries of the switch 1, and the switch 1 migrates, according to an aggregated flow entry, a data flow that matches the aggregated flow entry to a switch 2 for processing.

Optionally, it is determined that the flow table capacity of the source switch is greater than the specified threshold according to the following step: receiving an event alarm message sent by the source switch, where the event alarm message is used to indicate that the flow table capacity of the source switch is greater than the specified threshold.

In a specific implementation process, the controller may monitor a flow table capacity of each controlled switch in real time, and when determining that a flow table capacity of a switch reaches the specified threshold, immediately perform the foregoing flow entry aggregation. Alternatively, to reduce a burden of the controller, a form in which each switch performs reporting may be used. Each switch monitors a flow table capacity of the switch in real time, and when the flow table capacity of the switch reaches the specified threshold, sends an event alarm message to the controller to notify the controller that the flow table capacity of the switch reaches the specified threshold and that service migration processing is required.

Optionally, the generating an aggregated flow entry by aggregating the at least two initial flow entries is specifically: generating, according to a specified match field, the aggregated flow entry by aggregating at least two initial flow entries that have a same match field.

Optionally, the match field includes but is not limited to one or more of the following items: a TCP source port, a TCP destination port, a UDP source port, a UDP destination port, a VLAN ID, a VLAN priority, an Ethernet source MAC address, an Ethernet destination MAC address, a source IP address, a destination IP address, an Ethernet type (EtherType), and a switch ingress port.

Herein, IP in the source IP address and the destination IP address may be IPv4, or may be IPv6, which is not limited in this embodiment of the present disclosure.

In a specific implementation process, the controller may aggregate flow entries that have one or more items of the match field. For example, flow entries that have a same input port may be aggregated into one flow entry, that is, data flows received at the same input port are aggregated into one flow and the flow is migrated to the destination switch for processing. For another example, flow entries that have a same Ethernet type and a same destination IP address may be aggregated into one flow entry, that is, a data flow that matches the Ethernet type and the destination IP address of the aggregated flow entry is sent, according to the aggregated flow entry, to the destination switch for processing.

Optionally, the determining a destination switch for service migration includes: sending a processing capability query message to one or more other switches except the source switch, and receiving a processing capability answer message fed back by the one or more other switches; determining a processing capability of the one or more other switches according to the processing capability answer message; and determining the destination switch for the service migration in the one or more other switches according to the processing capability.

Optionally, the determining a destination switch for service migration includes: sending a processing capability query message to multiple other switches except the source switch, and receiving processing capability answer messages fed back by the multiple other switches; and determining processing capability information of the multiple other switches according to the processing capability answer messages fed back by the multiple other switches, and determining the destination switch for the service migration in the multiple other switches according to the determined processing capability information.

In a specific implementation process, when determining that a processing capability of the source switch is limited (a flow table is fully loaded), the controller may send the processing capability query message to the one or more other switches, instruct the one or more other switches to report processing capability information (for example, a current flow table capacity) of the one or more other switches, and receive the processing capability answer message sent by the one or more other switches, where the processing capability answer message includes the processing capability information of the one or more other switches; the controller determines the destination switch for the service migration according to the processing capability information of the one or more other switches and with reference to a current network topology and network bandwidth. Alternatively, the controller may periodically send the processing capability query message to each managed switch, and monitor a processing capability of each switch in real time.

Optionally, the aggregated flow entry is further used to indicate to the source switch that a priority of the aggregated flow entry is higher than a priority of each flow entry in the initial flow entries.

In a specific implementation process, because a switch matches a data flow to a flow entry according to a priority of the flow entry, after flow entry aggregation is performed, it may be set that a priority of an aggregated flow entry is higher than the priority of the flow entry that exists before aggregation. The aggregated flow entry is delivered to the source switch and indicates that the priority of the aggregated flow entry of the source switch is higher than the priority of the flow entry that exists before aggregation, such that the switch forwards the matched data flow according to the aggregated flow entry. It may be set that if the flow entry that exists before aggregation is never enabled within a specified time, the flow entry that exists before aggregation ages automatically. In this embodiment of the present disclosure, alternatively, the controller may directly instruct the source switch to delete the flow entry that exists before aggregation.

To better describe a procedure of the data flow processing method in this embodiment of the present disclosure, the following provides a further description using a specific embodiment.

Figure 4:
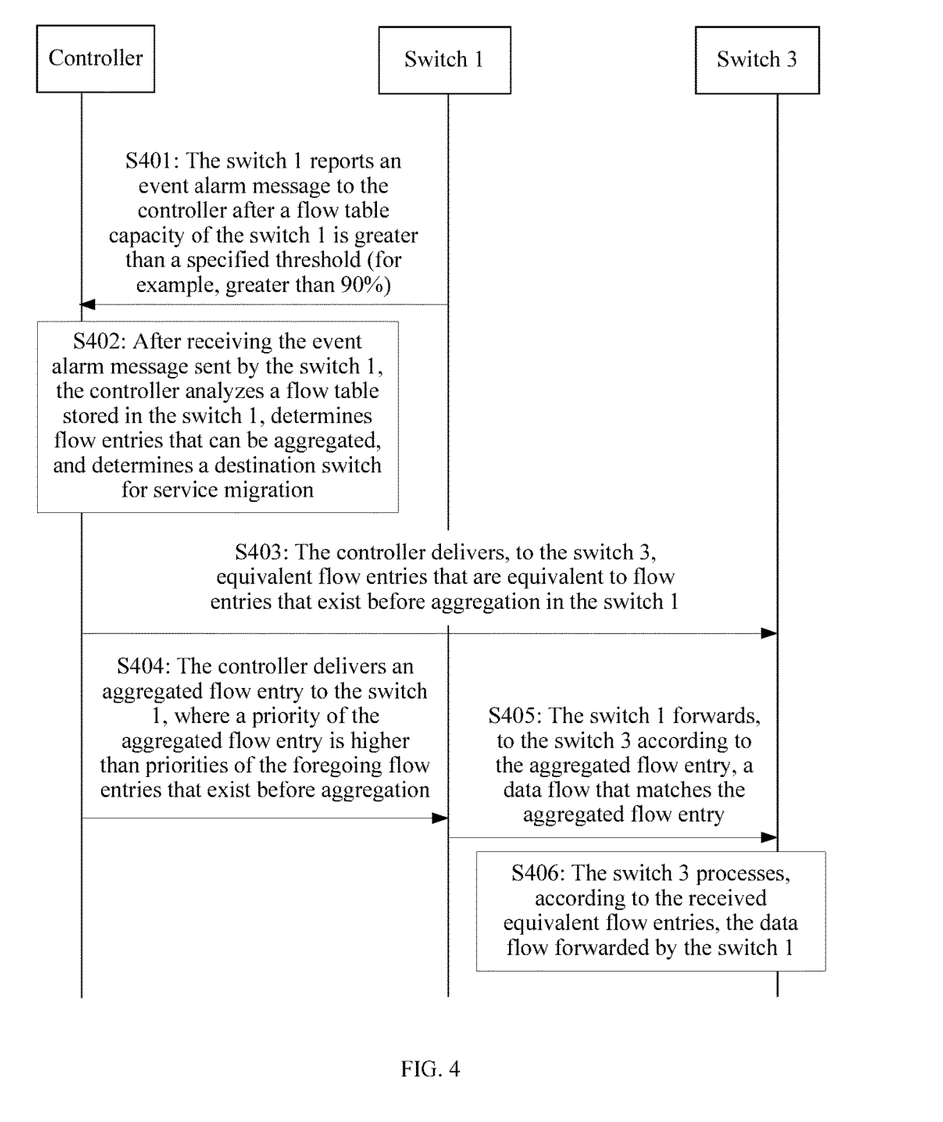
FIG. 4 is a flowchart of a data flow processing method according to embodiment 2 of the present disclosure.

As shown in FIG. 4, FIG. 4 is a flowchart of a data flow processing method according to embodiment 2 of the present disclosure, where the method includes:

S401: A switch 1 reports an event alarm message to a controller after a flow table capacity of the switch 1 is greater than a specified threshold (for example, the flow table capacity of the switch 1 is greater than 90%).

S402: After receiving the event alarm message sent by the switch 1, the controller analyzes a flow table stored in the switch 1, determines flow entries that can be aggregated, and determines a destination switch for service migration, where for example, a switch 3 is determined as the destination switch.

In this embodiment of the present disclosure, the controller may aggregate multiple flow entries into one flow entry according to item information included in a match field. A flow entry generally includes a match field and an action, and when item information carried in a data flow is consistent with item information in a match field of a flow entry, the controller may process the data flow according to the action in the flow entry. The match field generally includes a VLAN ID, a source MAC address, a destination MAC address, a source IP address, a destination IP address, an EtherType, an input port, and the like, and the action includes output, set field, push VLAN, and the like.

Figure 5:
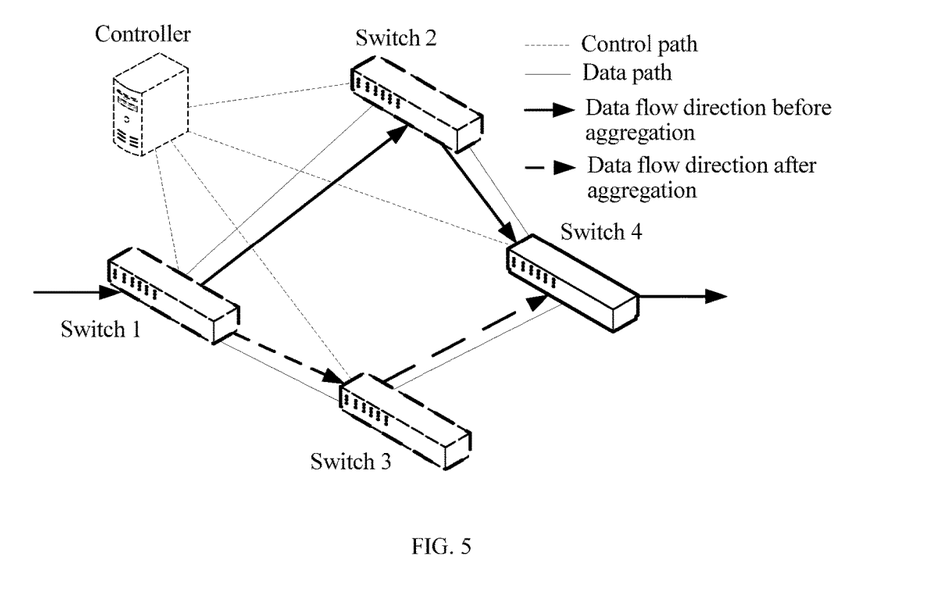
FIG. 5 is a schematic diagram of service migration according to embodiment 2 of the present disclosure.

As shown in FIG. 5, FIG. 5 is a schematic diagram of service migration in embodiment 2 of the present disclosure. It is assumed that the switch 1 originally stores three flow entries, where item information in a match field of a flow entry 1 includes: an Ethernet type is 0x0800 (which represents Internet Protocol IP data), a source IP address is 192.168.3.5, and a destination IP address is 10.122.9.2, and an action is output switch 2; item information in a match field of a flow entry 2 includes: an Ethernet type is 0x0800, a source IP address is 192.168.2.5, and a destination IP address is 10.122.9.2, and an action is output switch 3; and item information in a match field of a flow entry 3 includes: an Ethernet type is 0x0800, a source IP address is 192.168.4.5, and a destination IP address is 10.122.9.2, and an action is output switch 3. It can be seen that the Ethernet types and the destination IP addresses of the match fields of the three flow entries are the same, and the three flow entries may be aggregated into one flow entry. In this case, an Ethernet type of the flow entry is 0x0800, a destination IP address is 10.122.9.2, and other information such as a source IP address may be set as a wildcard item. If the controller determines the switch 3 as the destination switch, the action may be set as output switch 3, that is, a data flow that matches the aggregated flow entry is forwarded to the switch 3 for processing.

S403: The controller delivers, to the switch 3, equivalent flow entries that are equivalent to flow entries that exist before aggregation in the switch 1.

S404: The controller delivers an aggregated flow entry to the switch 1, where a priority of the aggregated flow entry is higher than priorities of the foregoing flow entries that exist before aggregation.

S405: The switch 1 forwards, to the switch 3 according to the aggregated flow entry, a data flow that matches the aggregated flow entry.

S406: The switch 3 processes, according to the received equivalent flow entries, the data flow forwarded by the switch 1.

Based on a same disclosure conception, an embodiment of the present disclosure further provides a data flow processing apparatus corresponding to the data flow processing method. Because a problem-resolving principle of the apparatus in this embodiment of the present disclosure is similar to that of the foregoing data flow processing method in the embodiments of the present disclosure, for implementation of the apparatus, reference may be made to implementation of the method, and no repeated description is provided.

Figure 6:
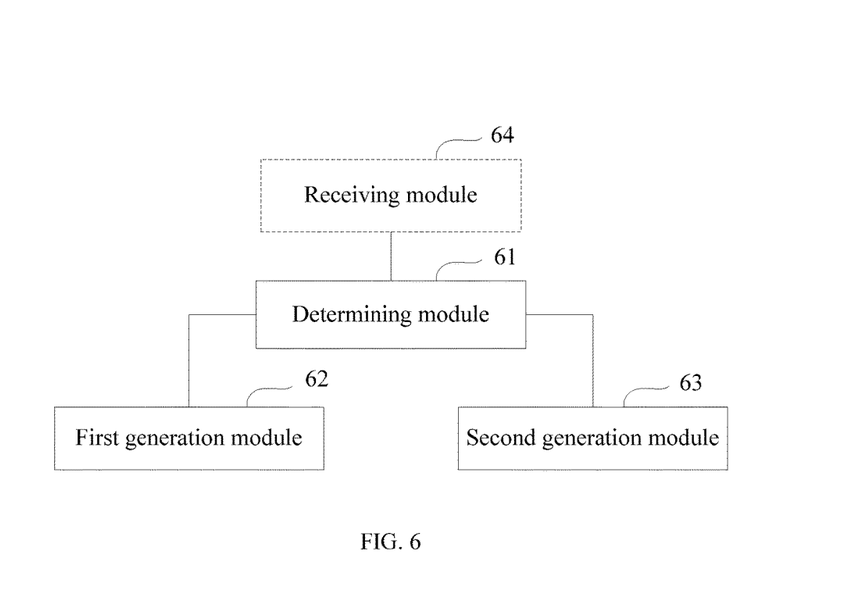
FIG. 6 is a schematic structural diagram of a data flow processing apparatus according to embodiment 1 of the present disclosure.

As shown in FIG. 6, FIG. 6 is a schematic structural diagram of a data flow processing apparatus according to embodiment 1 of the present disclosure, where the apparatus includes: a determining module 61 configured to: determine a destination switch for service migration when a flow table capacity of a source switch is greater than a specified threshold, indicate that a first generation module 62 and a second generation module 63 need to perform service migration processing, and notify the first generation module 62 of the determined destination switch; the first generation module 62 configured to: generate an equivalent flow entry that is equivalent to each initial flow entry of at least two initial flow entries stored in the source switch, and deliver each generated equivalent flow entry to the destination switch determined by the determining module 61, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry; and the second generation module 63 configured to: generate an aggregated flow entry by aggregating the at least two initial flow entries, and deliver the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

Optionally, the apparatus further includes: a receiving module 64 configured to: before the determining module 61 determines the destination switch for the service migration, receive an event alarm message sent by the source switch, where the event alarm message is used to indicate that the flow table capacity of the source switch is greater than the specified threshold.

Optionally, the second generation module 63 is specifically configured to generate, according to a specified match field, the aggregated flow entry by aggregating at least two initial flow entries that have a same match field.

Optionally, the match field includes one or more of the following items: a TCP source port, a TCP destination port, a UDP source port, a UDP destination port, a VLAN ID, a VLAN priority, an Ethernet source MAC address, an Ethernet destination MAC address, a source IP address, a destination IP address, an Ethernet type, and a switch ingress port.

Optionally, the determining module 61 is specifically configured to: send a processing capability query message to one or more other switches except the source switch, and receive a processing capability answer message fed back by the one or more other switches; determine a processing capability of the one or more other switches according to the processing capability answer message; and determine the destination switch for the service migration in the one or more other switches according to the processing capability.

Optionally, the aggregated flow entry is further used to indicate to the source switch that a priority of the aggregated flow entry is higher than a priority of each flow entry in the initial flow entries.

Figure 7:
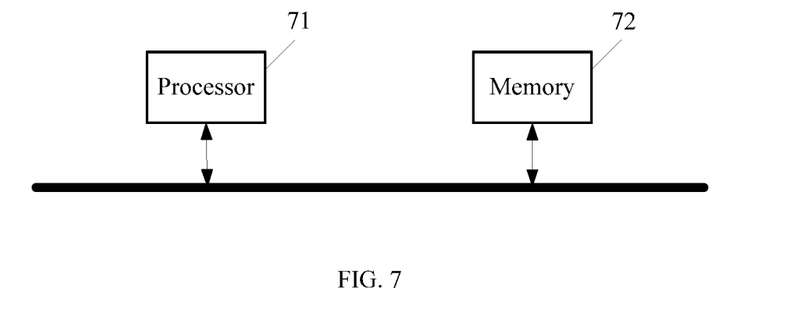
FIG. 7 is a schematic structural diagram of a data flow processing apparatus according to embodiment 2 of the present disclosure.

As shown in FIG. 7, FIG. 7 is a schematic structural diagram of a data flow processing apparatus according to embodiment 2 of the present disclosure, where the apparatus includes a processor 71 and a memory 72, and the data flow processing apparatus may be specifically a controller in OpenFlow. The processor 71 may be a central processing unit (CPU) or an application-specific integrated circuit (ASIC), or is configured as one or more integrated circuits that implement the embodiment of the present application. The memory 72 may include a high-speed random-access memory (RAM), and may further include a non-volatile memory (non-volatile memory), such as at least one magnetic disk memory.

The memory 72 stores an execution instruction, and when the apparatus runs, the processor 71 communicates with the memory 72, and the processor 71 executes the execution instruction, such that the apparatus executes the following method: determining a destination switch for service migration when a flow table capacity of a source switch is greater than a specified threshold; generating an equivalent flow entry that is equivalent to each initial flow entry of at least two initial flow entries stored in the source switch, and delivering each generated equivalent flow entry to the destination switch, where an equivalent flow entry that is equivalent to any initial flow entry is used by the destination switch to process a data packet that matches the any initial flow entry and that is forwarded by the source switch, and a data packet processing result corresponding to the equivalent flow entry is the same as a data packet processing result corresponding to the any initial flow entry; and generating an aggregated flow entry by aggregating the at least two initial flow entries, and delivering the aggregated flow entry to the source switch, where the aggregated flow entry is used by the source switch to match, to the aggregated flow entry, a data packet that matches each initial flow entry of the at least two initial flow entries, and forward, to the destination switch, the data packet that match the aggregated flow entry.

Optionally, in the method executed by the processor 71, it is determined that the flow table capacity of the source switch is greater than the specified threshold according to the following step: receiving an event alarm message sent by the source switch, where the event alarm message is used to indicate that the flow table capacity of the source switch is greater than the specified threshold.

Optionally, in the method executed by the processor 71, the generating an aggregated flow entry by aggregating the at least two initial flow entries is specifically: generating, according to a specified match field, the aggregated flow entry by aggregating at least two initial flow entries that have a same match field.

Optionally, the match field includes one or more of the following items: a TCP source port, a TCP destination port, a UDP source port, a UDP destination port, a VLAN ID, a VLAN priority, an Ethernet source MAC address, an Ethernet destination MAC address, a source IP address, a destination IP address, an Ethernet type, and a switch ingress port.

Optionally, in the method executed by the processor 71, the determining a destination switch for service migration includes: sending a processing capability query message to one or more other switches except the source switch, and receiving a processing capability answer message fed back by the one or more other switches; determining a processing capability of the one or more other switches according to the processing capability answer message; and determining the destination switch for the service migration in the one or more other switches according to the processing capability.

Optionally, the aggregated flow entry is further used to indicate to the source switch that a priority of the aggregated flow entry is higher than a priority of each flow entry in the initial flow entries.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A data flow processing method comprising:
    determining a destination switch for service migration when a flow table capacity of a source switch is greater than a specified threshold;
    selecting, by a controller, initial flow entries stored in the source switch, wherein the initial flow entries make up a subset of all flow entries in the flow table;
    generating, by the controller, equivalent flow entries that are equivalent to the initial flow entries;
    delivering the equivalent flow entries to the destination switch for processing data packets that match the initial flow entries and that are forwarded by the source switch, wherein a data packet processing result corresponding to an equivalent flow entry is the same as a data packet processing result corresponding to an initial flow entry;
    generating an aggregated flow entry by aggregating the initial flow entries; and
    delivering the aggregated flow entry to the source switch for matching the data packets to the aggregated flow entry and for forwarding the data packets to the destination switch.

2. The data flow processing method of claim 1, further comprising:
    receiving an event alarm message from the source switch; and
    determining, based on the event alarm message, that the flow table capacity of the source switch is greater than the specified threshold.

3. The data flow processing method of claim 1, wherein generating the aggregated flow entry comprises generating, according to a specified match field, the aggregated flow entry by aggregating at least two initial flow entries that have a same match field.

4. The data flow processing method of claim 3, wherein the match field comprises at least one of a Transmission Control Protocol (TCP) source port, a TCP destination port, a User Datagram Protocol (UDP) source port, a UDP destination port, and a switch ingress port.

5. The data flow processing method of claim 3, wherein the match field comprises at least one of a virtual local area network (VLAN) identifier (ID), a VLAN priority, and an Ethernet type (EtherType).

6. The data flow processing method of claim 3, wherein the match field comprises at least one of an Ethernet source media access control (MAC) address, an Ethernet destination MAC address, a source Internet Protocol (IP) address, and a destination IP address.

7. The data flow processing method of claim 1, wherein determining the destination switch comprises:
sending a processing capability query message to a switch other than the source switch;
receiving a processing capability answer message from the switch;
determining a processing capability of the switch according to the processing capability answer message; and
determining the destination switch for the service migration in the switch according to the processing capability.

8. The data flow processing method of claim 1, wherein the aggregated flow entry indicates to the source switch that a first priority of the aggregated flow entry is higher than a second priority of the initial flow entries.

9. A controller comprising:
a memory; and
a processor coupled to the memory and configured to:
determine a destination switch for service migration when a flow table capacity of a source switch is greater than a specified threshold;
selecting initial flow entries stored in the source switch, wherein the initial flow entries make up a subset of all flow entries in the flow table;
generate equivalent flow entries that are equivalent to initial flow entries stored in the source switch;
deliver the equivalent flow entries to the destination switch for processing data packets that match the initial flow entries and that are forwarded by the source switch, wherein a data packet processing result corresponding to an equivalent flow entry is the same as a data packet processing result corresponding to an initial flow entry;
generate an aggregated flow entry by aggregating the initial flow entries; and
deliver the aggregated flow entry to the source switch for matching the data packets to the aggregated flow entry and for forwarding the data packets to the destination switch.

10. The controller of claim 9, when the processor is further configured to:
receive an event alarm message from the source switch; and
determine, based on the event alarm message, that the flow table capacity of the source switch is greater than the specified threshold.

11. The controller of claim 9, wherein the processor is further configured to further generate the aggregated flow entry by generating, according to a specified match field, the aggregated flow entry by aggregating at least two initial flow entries that have a same match field.

12. The controller of claim 11, wherein the match field comprises at least one of a Transmission Control Protocol (TCP) source port, a TCP destination port, a User Datagram Protocol (UDP) source port, a UDP destination port, and a switch ingress port.

13. The controller of claim 11, wherein the match field comprises at least one of a virtual local area network (VLAN) identifier (ID), a VLAN priority, and an Ethernet type (EtherType).

14. The controller of claim 11, wherein the match field comprises at least one of an Ethernet source Media Access Control (MAC) address, an Ethernet destination MAC address, a source Internet Protocol (IP) address, and a destination IP address.

15. The controller of claim 9, wherein the processor is further configured to further determine the destination switch by:
sending a processing capability query message to a switch other than the source switch;
receiving a processing capability answer message from the switch;
determining a processing capability of the switch according to the processing capability answer message; and
determining the destination switch for the service migration in the switch according to the processing capability.

16. The controller of claim 9, wherein the aggregated flow entry indicates to the source switch that a first priority of the aggregated flow entry is higher than a second priority of the initial flow entries.

17. The controller of claim 9, wherein the processor is further configured to further select the initial flow entries independent of selection of the flow entries by the source node.

18. The controller of claim 9, wherein the flow table capacity is based on a number of the flow entries in the flow table.

19. The data flow processing method of claim 1, further comprising further selecting the initial flow entries independent of selection of the flow entries by the source node.

20. The data flow processing method of claim 1, wherein the flow table capacity is based on a number of the flow entries in the flow table.

* * * * *

UNITED STATES PATENT AND TRADEMARK OFFICE
CERTIFICATE OF CORRECTION

PATENT NO.        : 10,116,554 B2
APPLICATION NO.   : 15/242246
DATED             : October 30, 2018
INVENTOR(S)       : Hongkuan Liu et al.

It is certified that error appears in the above-identified patent and that said Letters Patent is hereby corrected as shown below:

On the Title Page

Item (56), U.S. PATENT DOCUMENTS, Line 2: "Subramaian" should read "Subramanian"

In the Claims

Column 13, Line 39: "selecting" should read "select"

Signed and Sealed this
Eleventh Day of December, 2018

Andrei Iancu
*Director of the United States Patent and Trademark Office*